324-77. SR 08-24-71 XR 3,601,592

United States Patent [11] 3,601,592

[72] Inventors Joseph T. Cutter
Boulder County;
Walter H. Elder, Silver Spring; Don G. Freeman, Gaithersburg; Richard Van Blerkom, Rockville, all of, Md.

[21] Appl. No. 28,892
[22] Filed Apr. 15, 1970
[45] Patented Aug. 24, 1971
[73] Assignee International Business Machines Corporation
Armonk, N.Y.

[54] FAST FOURIER TRANSFORM ADDRESSING SYSTEM
9 Claims, 4 Drawing Figs.

[52] U.S. Cl. .......... 235/156, 181/.5 R, 324/77 R, 340/15.5 DP, 340/172.5
[51] Int. Cl. .......... G06f 7/00, G06f 7/38
[50] Field of Search .......... 235/156, 152; 340/172.5, 15.5 DP; 181/.5 R; 324/77 R

[56] References Cited
UNITED STATES PATENTS
3,517,173 6/1970 Gilmartin et al. .......... 235/156
3,544,775 12/1970 Bergland et al. .......... 235/156 X

*Primary Examiner*—Malcolm A. Morrison
*Assistant Examiner*—Charles E. Atkinson
*Attorneys*—Hanifin & Jancin and Maurice H. Klitzman

ABSTRACT: A fast Fourier transform addressing system using the Danielson-Lanczos algorithm. The addressing system uses a basic relationship between addresses to allow implementation of the addressing system using a reduced number of address counters and reduced storage requirements for system constants.

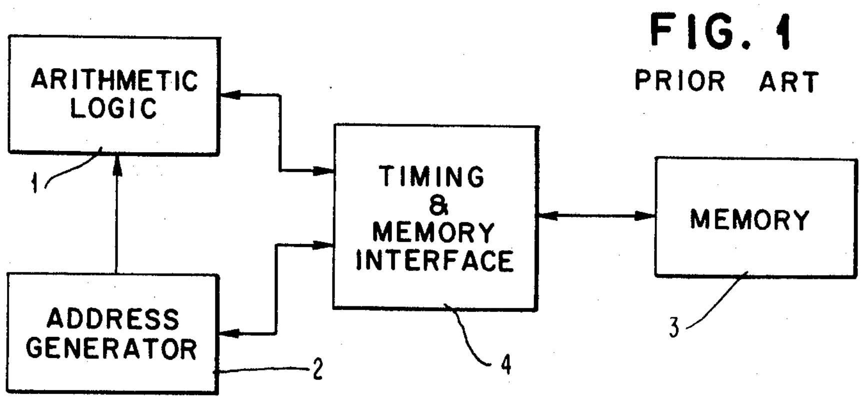

FIG. 1
PRIOR ART

FIG. 3

ADDRESSING SEQUENCE FOR N = 8

| A | B | V | C | D | ADDRESSES |
|---|---|---|---|---|---|
| 0 | $A+\frac{N}{2}$ | $0(\frac{N}{2})$ | A+V | $C+\frac{N}{2}$ | PASS 0 |
| 1 | $A+\frac{N}{2}$ | $0(\frac{N}{2})$ | A+V | $C+\frac{N}{2}$ | |
| 2 | $A+\frac{N}{2}$ | $0(\frac{N}{2})$ | A+V | $C+\frac{N}{2}$ | |
| 3 | $A+\frac{N}{2}$ | $0(\frac{N}{2})$ | A+V | $C+\frac{N}{2}$ | |
| 0 | $A+\frac{N}{2}$ | $0(\frac{N}{4})$ | A+V | $C+\frac{N}{4}$ | PASS 1 |
| 1 | $A+\frac{N}{2}$ | $0(\frac{N}{4})$ | A+V | $C+\frac{N}{4}$ | |
| 2 | $A+\frac{N}{2}$ | $1(\frac{N}{4})$ | A+V | $C+\frac{N}{4}$ | |
| 3 | $A+\frac{N}{2}$ | $1(\frac{N}{4})$ | A+V | $C+\frac{N}{4}$ | |
| 0 | $A+\frac{N}{2}$ | $0(\frac{N}{8})$ | A+V | $C+\frac{N}{8}$ | PASS 2 |
| 1 | $A+\frac{N}{2}$ | $1(\frac{N}{8})$ | A+V | $C+\frac{N}{8}$ | |
| 2 | $A+\frac{N}{2}$ | $2(\frac{N}{8})$ | A+V | $C+\frac{N}{8}$ | |
| 3 | $A+\frac{N}{2}$ | $3(\frac{N}{8})$ | A+V | $C+\frac{N}{8}$ | |

INVENTORS
JOSEPH T. CUTTER
WALTER H. ELDER
DON G. FREEMAN
RICHARD VAN BLERKOM
BY Maurice H. Klitzman
ATTORNEY The address generator of FIGS. 2A and 2B utilizes several control signals by which the address generator, arithmetic logic, and timing and memory interface of FIG. 1 interact. One of the control signals provided by the timing and memory interface is labeled INITIALIZE. This signal resets many of the counters and registers shown in FIGS. 2A and 2B, placing them in condition to begin the sequential generation of addresses necessary to compute the fast Fourier transform of a set of data.

Two timing signals labeled CLOCK and COUNT respectively, are provided to the address generator from the timing memory interface 4. The signal labeled CLOCK is a relatively fast pulse train and may be the output of an oscillator. The signal labeled COUNT is a slower pulse train with relatively narrow pulse width and a longer duration between pulses. COUNT may be generated from CLOCK through the use of several binary counting stages. The frequency of the signal labeled CLOCK must be at least $\log_2 M$ times the frequency of the signal labeled COUNT, where M is the maximum number of data points that can be handled at one time by the Fast Fourier Analyzer. The signal labeled N/2 is a binary signal received from the controlling computer. N/2 is equal to one-half of the number of data points in the data block to be transformed.

The signal labeled MULTIPLEX CODE from timing and memory interface 4 is also a binary signal and represents the number of time multiplexed sets of data within the total block of data to be transformed. For example, a total block of data consisting of 128 data points may contain two 64-point blocks of data to be transformed simultaneously. The capability of simultaneously transforming multiple blocks of data increases the operating efficiency of the Fast Fourier Analyzer.

A control signal labeled ALGORITHM COMPLETE is generated within the address generator 2 for transmission to timing and memory interface 4, to indicate when the Fourier transformation has been completed. The maximum data block size M, the block size N, the binary signal N/2, and the MULTIPLEX code are all binary numbers which are integer powers of 2, for example, 0, 2, 4, 8, and so forth.

Two control signals labeled COS 90° CONDITION and COS 0° CONDITION are generated within address generator and sent to the arithmetic logic. These two signals inhibit the multiply operations within the arithmetic logic whenever the angle $\theta$ is 90° or 0°. Because the values of cos 90° and cos 0° are zero and one respectively, products of these values and the real and imaginary parts of the variable $D$ will either be zero or equal to the variable $D$. These two special condition control signals result in improved accuracy and a more economical memory size. The value of cos 0° which is the integer number one can not be stored accurately in binary fraction form. If all values of cos $\theta$ including 0° and 90° were stored, M/4+1 memory locations would be needed. A memory of M/4+1 locations is not economical to build and address because M/4+1 is not an integer power of 2.

The address generator 10 in FIG. 2A generates a first result address $A$ and a second result address $B$, N/2 times during each of $\log_2 N$ passes. The A and B generator 10 consists of a sequential binary counter 101 and an adder 101. The sequential binary counter 101 is advanced one binary count by each COUNT pulse. Binary counter 101 is cleared to zero by RESET 1 which is the output of OR circuit 109. RESET 1 is generated by OR 109 whenever the INITIALIZE signal or a signal labeled END OF PASS is present at the inputs of OR 109. One input of adder 103 is connected to the output of sequential binary counter 101. The other input to adder 103 receives the binary signal N/2. The output of adder 103 is equal to the A address plus the binary signal N/2. This is by definition the B address as shown in FIG. 3.

An output signal labeled END OF PASS is generated by compare circuit 105 whenever the output of sequential binary counter 101 is equal to N/2.

Compare circuit 105 has one of its inputs connected to the output of binary counter 101, and its other input connected to the incoming signal lines carrying the binary number N/2.

Delay circuit 107 delays the END OF PASS signal for a short interval to prevent a logic race condition. As previously mentioned the END OF PASS signal is fed back through logical OR block 109 to generate RESET 1 which clears sequential binary counter 101 to zero. RESET 1 also controls other logic functions which are to occur at END OF PASS.

Control unit 20 will now be described. Whereas addresses A and B are cyclical counts and are identical for all passes, the same is not true for the V, C, and D addresses. One of the key elements in generation of these addresses is control unit 20. Control register 111 and compare circuit 105 operate together as control unit 20 to generate the sequence N/2, N/4, N/8, and so forth. In algebraic form the sequence N/2, N/4...is equal to $N/2^{(P+1)}$ where the pass number P is an integer equal to 0 or more. Control register 111 is a binary shift register which has $\log_2 M$ binary stages, where M is the maximum number of data points that can be transformed at one time by the Fast Fourier Analyzer. Control register 111 is cleared to zero by the INITIALIZE signal. After being cleared to zero, the binary signal N/2 is stored in control register 111. Register 111 is loaded through gates 115 under control of the INITIALIZE signal which has been delayed by delay 113. The INITIALIZE signal thereby clears control register 111 and stores the binary signal N/2 therein. Delay 113 eliminates a possible race condition which may occur if one were to simultaneously attempt to clear and load control register 111. Since the binary signal N/2 is an integer power of 2, the signal stored in control register 111 will contain only a single binary 1 and a plurality of binary zeros. Control register 111 is shifted right by each END OF PASS signal. Each right shift performs a divide by 2. Reference to the V and D address sequences shown in FIG. 3 shows that a factor in the V and D address sequence is N/2, and this factor is divided by two for each subsequent pass. During the first pass, the factor is N/2; during the second pass N/4; and so forth. One of the uses of the output of control register 111 is therefore to generate a portion of these addresses.

The generation of the V address signals in the intermediate address generator 30 will be discussed next because the V address is used to generate the C and D addresses. The V address is called an intermediate address because it is used to generate addresses C, D and W but is not used directly as an address.

Reference to FIG. 3 shows that the V addresses cannot be directly generated by control register 111. An additional counter is needed. The V address is the product of the output of the control register 111 multiplied by the integer portion of 4P[address A]/N, where P is the pass number.

From FIG. 3 it can be seen that the 4P[address A]/N portion of the V address is an accumulation of integer constants. 4P[address A]/N accumulates after N/2 computations on the first pass, after each N/4 computations on the second pass, after each N/8 computations on the third pass, and so forth. Each pass is complete after N/2 computations. Register 125 of FIG. 2B performs the multiplication and accumulation described above, under control of counter 117.

The intermediate address generator is composed of sequential control counter 117, compare 121, control added 127, and V address register 125 as well as delay 123 and gates 129. The sequential control counter 117 is advanced in synchronism with sequential binary counter 101 under control of COUNT pulses. Sequential control counter 117 is cleared to zero by either RESET 1 or RESET 2, through logical OR circuit 119. The purpose of RESET 2 is to cause the V address to accumulate.

The output of sequential control counter 117 is connected to one input of compare circuit 121. The other input to compare circuit 121 is connected to the output of control register 111. Compare circuit 121 is identical to compare circuit 105. Compare circuit 121 generates a signal labeled RESET 2 whenever the binary signal appearing in control register 111 is equal to the binary count appearing in sequential control counter 117. The signal RESET 2, undergoes a short delay within the delay circuit 123 before being fed back into logical OR circuit 119 to clear sequential control counter 117 to zero.

FAST FOURIER TRANSFORM ADDRESSING SYSTEM

CROSS-REFERENCES

Application Ser. No. 768,474 entitled "Real Time Digital Fourier Analyzer" by J. T. Cutter et al., and assigned to the same assignee as the instant application, relates to apparatus for measuring and testing of electrical waveforms and includes arithmetic logic means, memory means, and an address generator. The subject matter of the instant application is addressed to an improved address generator such as may be used in the real time digital Fourier analyzer of the referenced application.

BACKGROUND OF THE INVENTION

1. Field of the Invention

This invention relates to a method and apparatus for measuring and testing of electrical waveforms, and more specifically for generation of storage and retrieval addresses for system constants and data in a digital Fourier analyzer.

2. Description of the Prior Art

Algorithms for obtaining the Fourier transform of a series of digital samples on digital electronic computers are known in the prior art. Reference is made to the technical article in the IEEE Transactions on Audio and Electronics, Vol. AU-15, No. 2, June 1967, "What is the Fast Fourier Transform?" by W. T. Cochran et al. The algorithm shown in FIG. 1 and discussed within that article has been implemented into novel hardware by Cutter et al. in the referenced application Ser. No. 768,474. The apparatus of Cutter et al. is capable of performing the Fourier transform utilizing either the Cooley-Tukey algorithm or the Danielson-Lanczos algorithm with minor modifications in its address generating unit. The address generating unit of Cutter et al. requires three binary counters to perform the addressing. Two of these counters are used in forming the addresses and the third is used to generate control signals. Although the apparatus of Cutter et al. is adequate to perform its intended function, it is relatively complex and costly. The operating speed of Cutter et al. is adequate for the solution of most problems. However, there are instances where improved operating speeds are desired.

The operation of a fast Fourier analyzer can best be comprehended by reference to FIG. 1, which shows a fast Fourier analyzer in block diagram form. The arithmetic logic unit 1 performs the fast Fourier transform algorithm:

$$A=(C+DW)/2 \qquad (1)$$

$$B=(C-DW)/2 \qquad (2)$$

where $C$ and $D$ are variables which during the first pass, represent Nyquist samples of a waveform which are stored sequentially in memory 3. $W$ represents an exponential system constant of the form $e^{jk}$ , where $k$ is a constant and where $\Phi$ is an angle from zero to pi radians, which is the same as 0° to 180°.

The values of the real and imaginary parts of $W$ are stored in memory 3 as a table of fractions representing cos $\theta$ where $\theta$ is an angle between 0° and 90°. The values of cos 0° and cos 90° are not stored in memory 3 because they can be more accurately and economically handled by special logic.

$A$ and $B$ are variables representing the result of calculations performed in arithmetic unit 1. During subsequent passes variables $C$ and $D$ represent results $A$ and $B$ from previous passes.

For a more detailed treatment of the algorithm shown above, reference is made to the technical article in the IEEE Transactions on Audio and Electronics, Vol. AU-15, No. 2, June, 1967, "What is a Fast Fourier Transform"? by W. T. Cochran et al. For a more detailed and complete explanation of how arithmetic logic unit 1 implements the algorithm described above, reference is made to copending application Ser. No. 768,474 by Cutter et al.

SUMMARY OF THE INVENTION

It is an object of this invention to reduce the complexity of apparatus for generation of storage addresses for the storage and retrieval of data and system constants in a Fast Fourier Analyzer.

A more specific object is to incorporate a basic interrelationship between addresses utilized in executing the Danielson-Lanczos fast Fourier transform algorithm, to accomplish an increase in operating speed and a reduction in hardware required.

It is a further object of this invention to relate the binary representation of an address to the redundancy in the sine and cosine function representation of the system constants so as to allow a reduction in system constant storage requirements.

In carrying out the Danielson-Lanczos fast Fourier transform algorithm to accomplish the above objects, this invention uses a basic interrelationship whereby the addresses are generated from previously generated addresses rather than being independently generated. This interrelationship allows the elimination of a relatively complex binary counter with a resulting increase in operating speed. This invention also utilizes the relationship between the 2's complement of an address and the address of a sine function stored as a cosine function and the relationship between the most significant bit of an address and sine or cosine functions of angles greater than 90°. Those relationships reduce the storage requirements for the system constants by a factor of 4.

The addressing system of the instant invention determines the memory locations for all data transfers to and from the memory. For each computation of arithmetic logic addresses generated in the address generator are used as follows. $C$, $D$, and $W$ are fetched from separate locations in the memory. The arithmetic logic computation specified in equations (1) and (2) is performed. The results of the computation $A$ and $B$, are then stored in separate locations in memory 3.

Inasmuch as this invention is directed to the generation of addresses, the timing and memory interface are not herein described in detail. Any electronic storage unit (magnetic core memory, capacitor memory, monolithic transistorized storage, etc.) would operate satisfactorily with this invention. Since every memory type has its own individual detailed addressing methods and speed relationships, the timing and memory interface are specifically constructed to correlate the detailed memory addressing requirements with the output from the address generator. Such adaptation techniques are well within the knowledge of one skilled in the art.

BRIEF DESCRIPTION OF THE DRAWINGS

FIG. 1 shows a block diagram of a Fast Fourier Analyzer wherein the present invention finds utility.

FIG. 2A is placed above FIG. 2B, the whole diagram of the address generator can be viewed at one time.

FIG. 3 shows the interrelationships between the addressing sequences.

DESCRIPTION OF THE PREFERRED EMBODIMENT

Figure 2A:
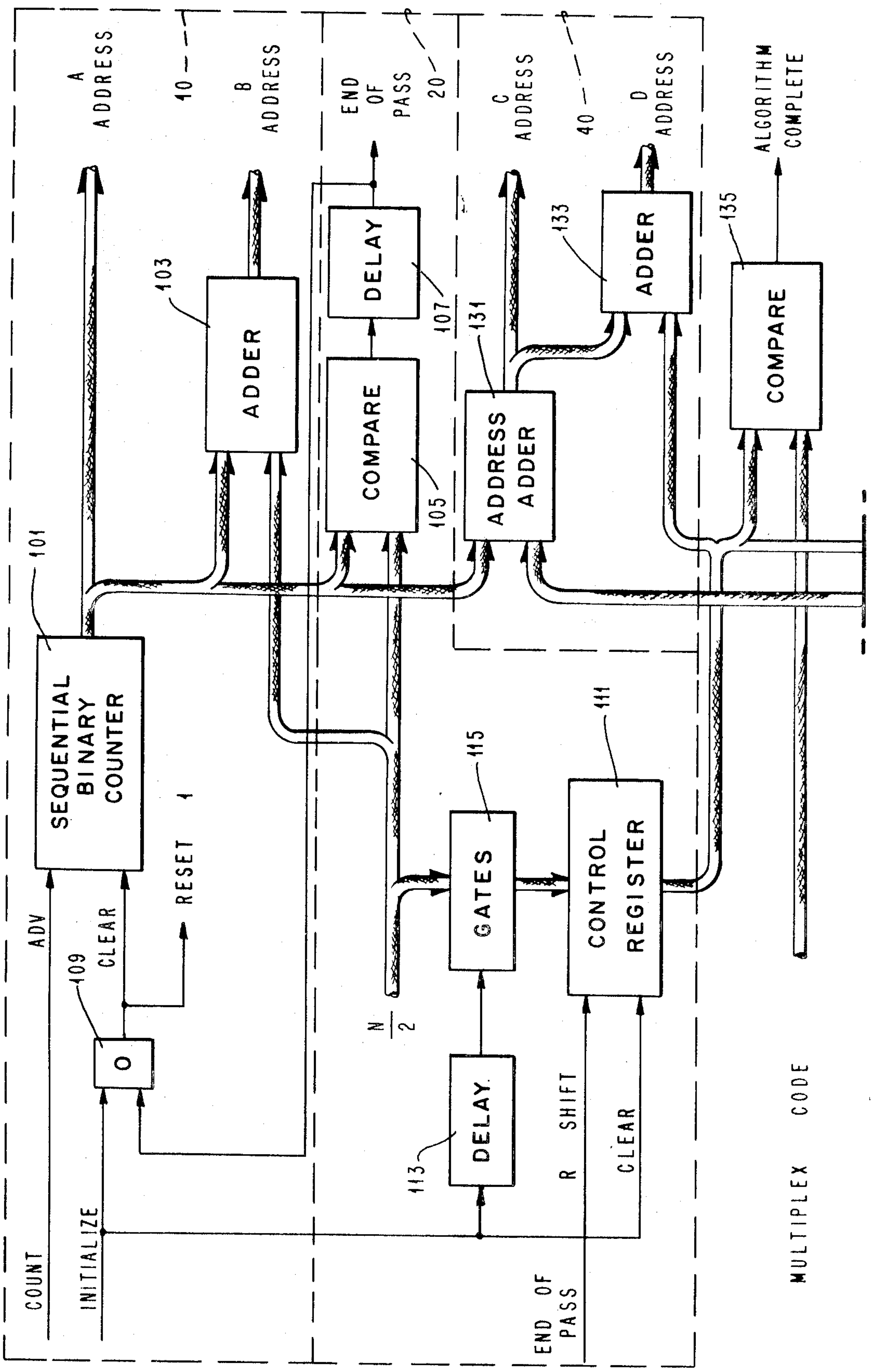
FIGS. 2A and 2B are a diagram of the address generator of the instant invention. When
Figure 2B:
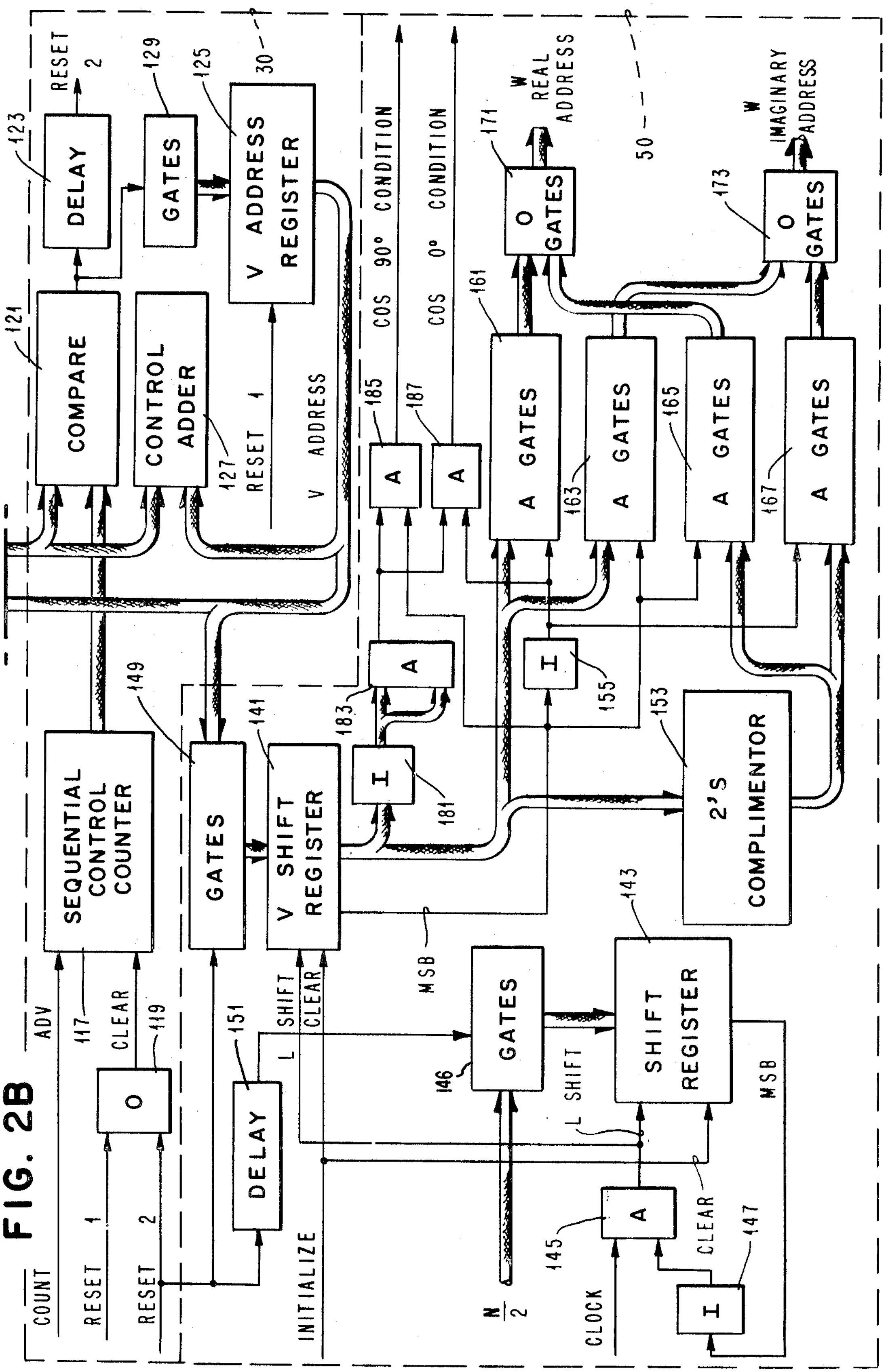

The preferred embodiment of the invention is shown in FIGS. 2A and 2B. The circuitry shown in FIGS. 2A and 2B performs the addressing sequences shown in FIG. 3. FIG. 3 shows that the Danielson-Lanczos algorithm is composed of several passes P. The Danielson-Lanczos algorithm requires N/2 computations for each pass. Therefore, N/2 address sets must be generated per pass. The total number of passes required to transform a single set of N data points is equal to $\log_2 N$. For example, where $N=8$, the number of passes required is $\log_2 8=3$. Each of the data memory locations and result memory locations is a double word containing both real and imaginary parts. The system constant memory locations are single words.

The delay provided by delay 123 is longer than the delay provided by delay 107 to prevent a logic race condition.

A storage register is provided, and labeled V address register 125. V address register 125 is reset to zero by RESET 1 which is generated by logical OR circuit 109 at END OF PASS. Addresses to be stored in V address register 125 are generated by control adder 127 and loaded into V address register 125 by gate 129 under control of the output of compare circuit 121. One input of control adder 127 is connected to the output of control register 111. The other input to control adder 127 is connected to the output of V address register 125. Whenever compare circuit 121 generates an output, the address stored in V address register 125 is replaced by the sum of the address stored in V address 125 and the binary number stored in control register 111. When operated under control of sequential control counter 117 and control register 111, through compare circuit 121 and control adder 127, V address register 125 increments in the V address sequence as shown in FIG. 3, effectively accomplishing both a multiplication and an accumulation.

A first data address C and a second data address D are generated from the V address in a second address generator 40 every time an address A is generated. Second address generator 40 is shown in FIG. 2A. Reference to FIG. 3 shows that each data address C is equal to an associated result address A added to an associated intermediate address V. Address adder 131 provides this addition function, having its first input connected to the output of sequential binary counter 101 and its second input connected to the output of V address register 125.

Each data address D is provided by adder 133 which has its first input connected to the output of address adder 131 and its second input connected to the output of control register 111. Reference to FIG. 3 makes it apparent that each address D is the sum of an associated address C and the contents of control register 111 as explained earlier.

Generation of each system constant real address and each system constant imaginary address in the third address generator 50 will now be described. The V address could be directly used to address the system constant memory locations, however M/2 double word memory storage locations would be required to store the system constants.

By use of the third address generator 50, the system constant storage requirements are reduced to M/4 single word memory locations. The single word memory locations are addressed by the W real and W imaginary addresses.

The system constants can be stored in a specially allocated memory area within memory 3, or they can be stored in an auxiliary storage. The system constants W, which are complex numbers, are not stored with the imaginary portion of the number immediately following the real portion as was done for the A, B, C, and D variables. For this reason two addresses are needed to address each system constant. The system constants required for calculation of the fast Fourier transform are stored only in the form of the cos $\theta$, where $\theta$ is an angle between zero and 90°. In the special cases where $\theta$ equals zero or 90°, the system constant values are not retrieved from storage because the multiply operations in arithmetic logic 1 are not performed. This is possible because the sine and cosine of 0° and 90° is either one or zero. To multiply by zero the arithmetic logic resets the value being multiplied to zero rather than going through a full multiply operation. To multiply by one the arithmetic logic merely leaves the number being multiplied as it is. M/4 cosine values will be sequentially stored in incremental angles of $2\pi/M$, where M is the maximum block size to be transformed. Even though in many cases the block size to be transformed will be less than M, it has been found to be more economical to store all M/4 system constant values, permanently in memory, than it would be to load, only those system constants required for a block size of less than M. This is true because memory space must be provided for the maximum possible block size, whether or not the maximum block size is currently being utilized.

The real and imaginary addresses of the system constant W can be generated directly from the V address only if the block size N being transformed is equal to the maximum block size M for which the table of cosine values has been stored. For those cases where the block size N being transformed is less than the maximum block size M, the value of the V address shown in the table in FIG. 2 must be multiplied by a factor equal to M/N.

For example, if the block size N is equal to half of the maximum block size M, every second value of the cosine table will be used. Where N=M/4, every fourth value in the cosine table will be used, and so forth. To convert the V address to the W addresses, in the above examples, V address is multiplied by 2 and 4 respectively, which is equal to the ratio M/N in each case.

The multiplication by the ratio of M/N is performed within V shift register 141, by shifting the V address left, $\log_2(M/N)$ times. The proper number of left shift pulses are generated by shift register 143 under control of AND block 145 and inverter 147. Shift register 143 has $\log_2 M$ shift register stages.

When the binary number M/2 is stored in shift register 143, a binary 1 exists in the most significant bit position and the remaining lessor significant bit positions will contain binary zeros. An output labeled MSB from the most significant bit position of shift register 143 is connected to the input of inverter 147, whose output is connected to one input of AND gate 145. The other input of AND 145 is connected to control signal CLOCK. Whenever a one bit exists in the most significant bit position of register 143, AND gate 145 will prevent clock pulses from shifting registers 143 and 141. From an examination of the circuit of FIG. 2B described above, it can be seen that whenever the data block size N to be transformed is equal to the maximum data block size M, N/2 will equal M/2 and AND gate 145 will not allow clock pulses to shift register 141. Whenever the data block size N is less than the maximum data block size M, V shift register 141 must multiply the V address by the ratio M/N. This is accomplished by loading the V address generated by V address register 125 into shift register 141 through gates 149. The loading of V shift register 141 is controlled by RESET 2 which has been generated in compare circuit 121 and delayed in delay circuit 123. While the signal labeled RESET 2 is loading V shift register 141, it is also being delayed by delay circuit 151. After emerging from delay circuit 151, the signal labeled RESET 2, gates the binary number N/2 into shift register 143 through gates 146, replacing the number M/2 which had previously existed within shift register 143. Whenever the number N/2 is less than the number M/2, the most significant bit position of shift register 143 will contain a zero allowing AND gate 145 to pass clock pulses to the shift inputs of shift registers 141 and 143. By left shifting the number N/2 a sufficient number of times so that it equals the number M/2, the ratio M/N has been generated. Since the same number of shift pulses enter shift registers 141 as entered shift register 143, the contents of V shift register 141 have been effectively multiplied by the ratio M/N. The output of each stage of V shift register 141, except the most significant stage, is connected to 2's complementer 153. Register 141 and 2's complementer 153 generate a first system constant address and a second system constant address respectively.

After being multiplied by the ratio M/N, the first system constant address in shift register 141 could be directly used to address a system constant table with M/2 complex numbers. The instant invention uses gating means consisting of logic blocks 153, 155, 161, 163, 165, 167, 171, and 173 to allow the system constant storage to be reduced by a factor of 4, to M/4 real numbers. These numbers are values of the cosine function, over the angle range from 0° to 90°. The fast Fourier transform computation requires a complex system constant W. W real and W imaginary parts of the complex system constant W are not in adjacent storage locations as was the case for the real and imaginary parts of the variables A, B, C, and D. The addresses for W real and W imaginary must be computed separately in register 141, 2's complementer 153, and a gating means. The $\log_2(M/4)$ least significant stages of register 141 will contain one of the W addresses. The other W address is computed by taking the 2's complement of the $\log_2 M/4)$ bit W address generated in register 141. The bit of significance $Log_2(M/2$, labeled MSB of register 141 controls which of these W addresses is to be used for the real address, and which is to be used for the imaginary address. The 23 s complement operation generates the correct address because of symmetries in the cosine function.

The binary 2's complement operation is not related mathematically to the complement angle relationship that governs the symmetry in the cosine table. The actual relationship between the 2's complement of an address and the complement of an angle can be more clearly seen by reference to a cosine table which has M/4 cosine values. If the cosine of an angle $\theta$ is stored in a location X of the cosine table, the sine of $\theta$ will be stored in a location M/4–X. The address of sine $\theta$ could be generated from the address X of cosine theta locations by subtracting X from M/4. However, the sine $\theta$ address can be generated more efficiently by recognizing that the address (M/4–X is equal to the binary 2's complement of the address X. Two's complement logic is significantly less complex than subtraction logic.

The details of the multiplying, complementing, and gating circuitry portions of third address generator 50 will now be described. V shift register 141 contains $\log_2(M/2)$ shift register stages. The output of the most significant register stage, is labeled MSB which means most significant bit. The output of the most significant stage of shift register 141 is connected to inverter 155.

AND gates 161 consist of $\log_2(M/4)$ gates, each AND gate having two inputs and one output. AND gates 163, 165, and 167, in like manner consist of $\log_2(M/4)$ individual AND gates, each AND gate having two inputs and one output. One input of each of AND gates 163, and each of AND gates 165, is connected to the most significant stage of shift register 141. One input of each of AND gates 161, and each of AND gates 167 is connected to the output of inverter 155. The other input of each of AND gates 165 and each of AND gates 167 is connected to an output of 2's complementer 153. The other input of each of AND gates 161 and each of AND gates 163 is connected to an output of V shift register 141. Each output of AND gates 161 is OR'ed with its respective AND gates of AND gate 165 by one of $\log_2(M/4)$ OR gates 171 to generate a system constant W real address. Each AND gate of AND gates 163 is OR'ed with its respective AND gate output of AND gates 167 by OR gates 173 to generate a system constant W imaginary address.

Output lines COS 90° CONDITION and COS 0° CONDITION are generated by AND gates 185 and 187 respectively. One input of each of AND gates 185 and 187 is connected to the output of AND gate 183. Each of the $\log_2(M/4)$ individual inverter circuits within inverter 181 has its input connected to one of $\log_2(M/4)$ least significant stages of register 141. The output of each of the inverter circuits of inverter 181 is connected to one of $\log_2(M/4)$ inputs of AND gate 183. The remaining unconnected input of AND gate 185 is connected to the output of the most significant stage of register 141. The remaining unconnected input of AND gate 187 is connected to the output of inverter 155.

The second compare means of FIG. 2A will now be described. Compare circuit 135 generates the ALGORITHM COMPLETE signal, which indicates that the proper number of passes have been completed, and the addressing sequence is terminated. The number of passes required to perform the fast Fourier transform of a single block of data (i.e., nonmultiplexed data) is equal to $\log_2 N$ where N is the number of data points in the data block being transformed. For example, a data block size of 8 will require three passes for generation of the Fourier transform. One input to compare circuit 135 is the MULTIPLEX CODE control signal.

If the data block being transformed is multiplexed, fewer than $\log_2 N$ passes will be required. For example, one less pass is required for a two way multiplexed data block; two less passes are required for a four way multiplexed data block and so on. The MULTIPLEX CODE signal is a binary signal, equal to an integer one-half of the number of multiplexed data sets within the data block N.

The other input to compare circuit 135 is the output of control register 111. The output of register 111 is a binary signal which represents the number of remaining passes required to complete the algorithm for a nonmultiplexed block of data points. Therefore, when the number of remaining passes equals the MULTIPLEX CODE signal the algorithm is complete.

By way of summary it is pointed out that each of the A, B, C, and D addresses are relative addresses, and do not directly address an absolute address within memory 3 of FIG. 1. Final absolute addresses are generated from the A, B, C, and D addresses and the END OF PASS signal by timing and memory interface 4, in accordance with the Danielson-Lanczos algorithm. The A and B result addresses refer to a separate block of memory 3, from the C and D data storage block within memory 3. At the end of each pass these storage blocks are interchanged in memory 3 under control of the END OF PASS signal. During a subsequent pass data variables C and D are taken from the storage block into which result variables A and B had been stored during the previous pass.

OPERATION

The operation of the instant invention will now be described. For this example, it will be assumed that a single data block of 8 data points is to be transformed. For purposes of this example, we will also assume that the maximum block size of data points which can be transformed, M, is equal to 16. M equal to 16 means that counter 101, control register 111, counter 117, and shift register 143 will each have 4 binary stages. V address register 125 and V shift register 141 will each have three binary stages. Two's complementer 153 will have the capability of complementing a 2 bit binary number, and gates 161–167, gates 171, 173, and inverter 181 will each contain two internal gates. The W system constant table will be composed of cos 0°, cos 22.5°, cos 45°, cos 67.5° in locations 0, 1, 2, and 3 respectively. The values of these cosines will be in binary fractional form. The cos 0° which equals 1 cannot accurately be stored in binary fractional form but as explained earlier, the cos 0° value is never retrieved from the W system constant table. The control signal COS 0° CONDITION causes arithmetic logic 2 to leave that part of the variable D being multiplied by one as it is rather than going through the full retrieval and multiplication by operations.

The signal labeled INITIALIZE begins the operation by clearing sequential binary counter 101 to zero, clearing control register 111 to zero, clearing sequential control counter 117 to zero, clearing V address register 125 to zero, and clearing shift registers 141 and 143 to zero. After being delayed by delay circuit 103, the signal INITIALIZE loads the binary signal N/2 into control register 111. In this example the data block size N is equal to 8 data points and therefore N/2 is equal to a binary 0100. At this point the addresses being generated by the fast Fourier transform addressing system are those shown in line 1 of pass 0 in FIG. 3. The A address output will be 0000, and the B address output will be 0100. At this time the output of sequential control counter 117 is 0000 and the output of control register 111 is 0100 and therefore compare circuit 121 will register no compare, and the V address register 125 will retain 000. The C address is the A address plus the V address and therefore it also will be 0000. The D address is equal to the C address plus N/2 which is at the present time stored in control register 111 therefore the D address will be 0100. V shift register 141 has 000 stored therein which causes the outputs of AND gates 183 and 187 to be active generating the COS 0° CONDITION. This signal causes arithmetic logic 1 of FIG. 1 to generate a result which is the same as if the complex variable D stored in the data memory location addressed by the D address had been multiplied by 1+j0.

The COUNT signal will then advance sequential binary counter 101 and sequential control counter 117. This causes the A address to advance to 0001 and the B address to advance to 0101. The V address will remain at 000 because compare circuit 121 still registers no compare. The C address will be equal to 0001 and the D address will be equal to 0101, since control register 111 still contains 0100. The next COUNT signal advances sequential binary counter 101 and sequential control counter 117 to a count of 0010. The B, V, C, and D addresses will then be 0110, 000, 0010, and 0110 respectively. The next COUNT signal will advance the A, B, V, C, and D addresses to 0011, 0111, 000, 0011, and 0111, respectively. The next COUNT signal will advance sequential binary counter 101 and sequential control counter 117 to 0100. At the count of 0100 however, compare circuits 105 and 121 will provide outputs since N/2 is equal to 0100. The output of compare circuit 121 will gate the output of control adder 127 into V address register 125 temporarily. The output of compare circuit 105 is delayed by delay 107 providing END OF PASS and RESET 1 signals. Reset 1 resets counter 101, and counter 117 to 0000, and resets V address register 125 which had been temporarily loaded with the output of adder 127, back to 000. The temporary loading of register 125 serves no purpose and is therefore redundant and is only allowed in order to save the logic which would be required to inhibit the temporary loading. Since the output of compare circuit 121 was active, RESET 2 will also be generated after a delay time longer than the delay time of delay circuit 107. RESET 2 will cause other operations to occur in the third address generator 50 but since delay 123 causes RESET 2 to be propagated after RESET 1 has returned the contents of V address register 125 to 000, those redundant operations will have no effect on correct operation of the address generator. Although these operations may be thought to be redundant at the end of the first pass, the operations are necessary at the end of each subsequent pass and therefore are included at the end of all passes to simplify the circuits. The END OF PASS signal generated by compare circuit 105 also shifts the contents of control register 111 one binary place to the right, effectively dividing by 2. The binary number 0100 which was stored in the register by the INITIALIZE signal, now appears as 0010.

RESET 1 has reset the counters 101 and 117 and V address register 125 which places the address generator into the first step of the second pass. The addresses generated for A, B, V, C, and D are 0000, 0100, 000, 0000, and 0100. The first COUNT signal in the second pass advances sequential binary counter 101 and sequential control counter 117 to 0001. The A, B, V, C, and D addresses are generated as before. On the second COUNT signal in the second pass, sequential binary counter 101 and sequential control counter 117 are advanced to a count of 0010. Since control register 111 also contains a 0010, compare circuit 121 provides an output labeled RESET 2. Under control of RESET 2, the contents of V address register 125 are effectively added to the contents of control register 111 in control adder 127, and the result is stored back into V address register 125 by AND gates 129. RESET 2 also clears sequential control counter 117 to zero and gates the new V address which has been stored in V address register 125 into V shift register 141 via gate 149. The delay circuit 123 provides a short time delay sufficient to allow control adder 127 to add the 000 which had previously been stored in V address register 125 to the 0010 in control register 111 prior to gating the result into the shift register 141. Delay circuit 151 further delays RESET 2 allowing the new V address to be loaded into shift register 141 prior to loading the number N/2 into shift register 143. In our example, N/2 equals 0100 which is less than the maximum M/2 of 1000. Therefore, a zero exists in the most significant bit position of shift register 143. The zero in the most significant bit position of shift register 143 controls AND 145 through inverter 147 to allow clock signals to shift registers 143 and 141 to the left until a binary 1 appears in the most significant bit position of shift register 143.

In our example registers 141 and 143 will shift left one position, register 141 will now contain 010 multiplied by M/N which is 100. Since register 141 has a one bit in its most significant stage and zero bits in its two least significant stages, COS 90° CONDITION will be generated by AND gates 185 and 183. This signal causes arithmetic logic 1 of FIG. 1 to generate a result which is the same as if the variable D stored in the memory 3 had been multiplied by a system constant 0+j1. During the last step of the second pass, the A, B, V, C, and D addresses are 0011, 0111, 010, 0101, and 0111 respectively, and COS 0° CONDITION is again generated.

During the third pass the A and B addresses will increment as during the previous passes. A new V address will be generated at the end of each step however, because the number stored in control register 111 is 0001 during the third pass. Each COUNT will advance sequential control counter 117 from 0000 to 0001 causing compare 121 to generate the signal RESET 2 which will reset control counter 117 back to 0000. Thus, each COUNT signal will generate a new V address during the third pass. During the first step of the third pass COS 0° CONDITION will be active. During the second step of the third pass register 141 will contain the binary number 010. AND gate 183 will not be active during this step because one of the least significant stages of register 141 contains a 1 bit. The most significant stage of register 141 contains a zero therefore AND gates 161 and 167 will be opened, selecting the two lower order bits in V shift register 141 as the system constant W real address and selecting output of complementer 151 as the system constant W imaginary address.

The W real address will be 10 and the W imaginary address will also be 10 since the 2's complement of 10 is equal to 10. Address location 10 contains the cos 45°. This value will be sent to the arithmetic logic 1 from memory 3 as both the real and imaginary parts of the system constant. During the third step of the third pass, COS 90° CONDITION signal will again be active. During the fourth step of the third pass an exponential system constant at 135° is needed to perform the Danielson-Lanczos algorithm and V shift register 141 will contain a first system constant address of 110. The gating means, AND gates 161 through 173, will select the two lower order bits in V shift register 141 as the system constant real address and select the output of the complementer 153 as the system constant imaginary address.

At the end of the third pass, the END OF PASS signal again shifts control register 111 to the right causing its contents to equal zero. Since one block of data points was being transformed, the MULTIPLEX CODE signal will be equal to 0000. Now the contents of control register 111 and the MULTIPLEX CODE are both equal to zero, compare circuit 135 generates the ALGORITHM COMPLETE signal which halts the address generation and transformation sequence, by inhibiting further count pulses.

While the invention has been particularly shown and described with respect to a preferred embodiment thereof, it will be understood by those skilled in the art that various changes in form and detail may be made therein without departing from the spirit and scope of the invention. For example, it is recognized that the multiplication operations performed in shift register 141 and register 125 could have been implemented using separate multiplication means. Further it is recognized that although the maximum block size M of this embodiment was chosen to equal 16, it is well within the skill of the art to build an embodiment of the instant invention to accommodate any maximum block size.

What we claim is:

1. A method for generating sequences of addresses for the Danielson-Lanczos fast Fourier transform algorithm comprising the steps of:

generating N/2 sequential first result addresses A during each pass P, where P is an integer from 0 to $[(\log_2 N)-1]$, said value of said integer P being increased by 1 after each pass has been completed, and where N is the number of data points being transformed;

generating a second result address B for each of said first result addresses A by adding N/2 to said first result address A, where N is the number of data points being transformed;

generating a binary signal $N/2^{(P+1)}$ for each pass P;

generating an intermediate address V for each said address A by multiplying said binary signal $N/2^{(P+1)}$ by an integer portion of a fraction 4P [address A]/N;

generating a first data address C for each of said first result addresses A, by adding said address A to said intermediate address V associated with said address A;

generating a second data address D for each of said result addresses A by adding said first data address C associated with said address A to said binary signal $N/2^{(P+1)}$.

2. A method for generating a set of addresses for the Danielson-Lanczos fast Fourier transform algorithm comprising the steps of:

generating a first result address A;

generating a second result address B by adding a binary signal N/2 to said address A, where N is the number of data points being transformed;

generating a binary signal $N/2^{(P+1)}$ where P is a pass number;

generating an intermediate address V by multiplying said binary signal $N/2^{(P+1)}$ by an integer portion of a fraction 4P [address A]/N;

generating a first data address C by adding said address A to said intermediate address V;

generating a second data address D by adding said first data address C to said binary signal $N/2^{(P+1)}$;

multiplying said intermediate address by M/N where M is an integer equal to a maximum value of N, to generate a first system constant address;

complementing $\log_2(M/4)$ least significant bits of said first system constant address to generate a second system constant address;

selecting said $\log_2(M/4)$ least significant bits of said first system constant address as a system constant real address and said second system constant address as a system constant imaginary address whenever a bit of significance $\log_2(M/2)$ of said first system constant address is a binary zero;

selecting said $\log_2(M/4)$ least significant bits of said first system constant address as a system constant imaginary address and said second system constant address as a system constant real address whenever said bit of significance $\log_2(M/4)$ of said first system constant address is a binary one.

3. A fast Fourier transform addressing system for generating the sequences of addresses required by the Danielson-Lanczos fast Fourier transform algorithm, comprising:

a first address generator for generating a first result address A and a second result address B, N/2 times during each pass P;

control means connected to said first address generator, for generating at its output a binary signal $N/2^{(P+1)}$ where P is an integer from 0 to $[(\log_2 N)-1]$, said integer P being 0 during a first of said passes, the value of said integer P being increased by 1 after each pass has been completed;

an intermediate address generator connected to said control means, for generating an intermediate address whenever one of said first result addresses is generated, said intermediate address being equal to the output of said control means multiplied by the integer portion of 4P [address A]/N;

a second address generator connected to said first address generator, to said intermediate address generator, and to said control means, for generating a first data address C and a second data address D whenever one of said first result addresses is generated by adding said first result memory address to said intermediate address thereby generating said first data address C and by adding said first data address C to the output of said control means.

4. The fast Fourier transform addressing system of claim 3 wherein said first address generator further comprises:

a first counting means for sequentially generating said first result addresses A;

a first adding means connected to said counting means for adding a binary signal N/2 to each of said first result addresses, said first adding means thereby generating said second result addresses B;

and where said second address generator further comprises:

a second adding means connected to said first counting means and to said intermediate address generator, for generating said first data addresses C; and a third adding means connected to said second adding means and to said control means, for generating said second data addresses D.

5. The fast Fourier transform addressing system of claim 4 wherein said control means further comprises:

a first compare means connected to said first counting means, for providing a first reset signal whenever an address of said first result addresses is equal to said binary signal N/2;

a control register means for storage of a binary signal N/2, said control register being shifted one position each time said first compare means provides said first reset signal.

6. The fast Fourier transform addressing system of claim 3 further comprising:

a second compare means connected to said control register for generating an algorithm complete signal when the contents of said control register equals a multiplex code signal, said multiplex code signal being a value equal to an integer one-half of a number of multiplex data sets of said N data points being transformed.

7. The fast Fourier transform addressing system of claim 3 wherein said intermediate address generator further comprises:

a second counting means for counting in synchronism with said first counting means;

a second compare means connected to said control register and to said second counting means, for generating a second reset signal whenever the contents of said control register and said second counting means are equal;

an address register for storing said intermediate address, said address register being cleared by said first reset signal;

third adding means connected to said control register and to said address register, for generating said intermediate address, said intermediate address being loaded into said address register by said second reset signal.

8. The fast Fourier transform addressing system of claim 3 further comprising:

a multiplication means connected to said intermediate address generator for generating a first system constant address which is a product of said intermediate address and M/N, where M is an integer equal to a maximum value of N;

a complementing means connected to a $\log_2(M/4)$ least significant outputs of said multiplication means, for generating a 2's complement of a $\log_2(M/4)$ least significant bits of said first system constant address, an output of said complementing means being a second system constant address;

gating means for selecting said $\log_2(M/4)$ least significant bits of said first system constant address as a system constant real address and said second system constant address as a system constant imaginary address, whenever a bit of significance $\log_2(M/2)$ of said first system constant address is a binary zero, and selecting said second system constant address as said system constant real address and said $\log_2(M/4)$ least significant bits of said first system constant address as said system constant imaginary address, whenever said bit of significance $\log_2(M/2)$ of said first system constant address is a binary one.

9. The fast Fourier transform addressing system of claim 8 wherein said multiplication means further comprises:

a multiplication shift register having an input connected to said address register and having an output connected to said complementing means, said multiplication shift register having a left shift input connected to a shift pulse generator for shifting said intermediate address left $\log_2(M/N)$ times.